(12) United States Patent
Sadasivuni (10) Patent No.: US 12,398,886 B2
(45) Date of Patent: Aug. 26, 2025

(54) COMBUSTOR FOR A GAS TURBINE

(71) Applicant: Siemens Energy Global GmbH & Co. KG, Munich (DE)

(72) Inventor: Suresh Sadasivuni, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/007,080

(22) PCT Filed: Aug. 12, 2021

(86) PCT No.: PCT/EP2021/072492
§ 371 (c)(1),
(2) Date: Jan. 27, 2023

(87) PCT Pub. No.: WO2022/043079
PCT Pub. Date: Mar. 3, 2022

(65) Prior Publication Data
US 2023/0288067 A1 Sep. 14, 2023

(30) Foreign Application Priority Data
Aug. 25, 2020 (GB) ..................... 2013274

(51) Int. Cl.
*F23R 3/14* (2006.01)
*F02C 9/40* (2006.01)
(Continued)

(52) U.S. Cl.
CPC .................. *F23R 3/14* (2013.01); *F02C 9/40* (2013.01); *F23R 3/286* (2013.01); *F23R 3/36* (2013.01);
(Continued)

(58) Field of Classification Search
CPC ............ F23R 3/286; F23R 3/36; F23R 3/346; F23R 2900/03343; F23R 3/343; F23R 3/34; F23R 3/246
See application file for complete search history.

(56) References Cited

U.S. PATENT DOCUMENTS 4,100,733 A 7/1978 Striebel et al.
6,237,343 B1 5/2001 Butler
(Continued)

FOREIGN PATENT DOCUMENTS

CN 105940264 A 9/2016
CN 107044656 A 8/2017
(Continued)

OTHER PUBLICATIONS

PCT International Search Report and Written Opinion of International Searching Authority mailed Nov. 5, 2021 corresponding to PCT International Application No. PCT/EP2021/072492 filed Aug. 12, 2021.
(Continued)

*Primary Examiner* — Phutthiwat Wongwian
*Assistant Examiner* — Roberto Toshiharu Igue (57) ABSTRACT

A combustor (36) for a gas turbine, the combustor (36) comprising a combustor axis (44) about which is arranged in flow sequence a radial swirler (40), a pre-chamber (42) and a combustion chamber (38). The radial swirler (40) comprises a base plate (45), an annular array of swirler vanes (46), defining swirler slots (47), arranged around the base plate (45), a main fuel injector (48A, 48B) for injecting a main fuel and a pilot fuel injector (50) for injecting a pilot fuel. The combustor comprises a premixer nozzle (70) located on the combustion chamber (38). The premixer nozzle (70) comprising a housing (78), an array of tubes (80) within the housing (78) and a first fuel gallery (72) for supplying a first fuel (83). Each tube (80) of the array of
(Continued)

tubes (80) comprising an inlet (86), an outlet (88), a first aperture (90) and a second aperture (92). The first fuel gallery (72) is arranged to supply the first fuel (83) to the first aperture (90) and/or the second aperture (92). In use, air (34) is supplied to the combustor and a first portion of the air (34A) passes through the radial swirler (40) and a second portion of the air (34B) passes through the tubes (80) of the array of tubes (80) from inlet (86) to outlet (88) and mixes with the first fuel (83) that passes through the first aperture (90) and/or the second aperture (92).

16 Claims, 5 Drawing Sheets (51) Int. Cl.
  *F23R 3/28* (2006.01)
  *F23R 3/34* (2006.01)
  *F23R 3/36* (2006.01)
(52) U.S. Cl.
  CPC .................. *F05D 2240/35* (2013.01); *F23R 2900/03343* (2013.01)

(56) References Cited

U.S. PATENT DOCUMENTS

| | | | |
|---|---|---|---|
| 8,801,428 B2* | 8/2014 | Melton | F23D 14/62 60/737 |
| 10,240,795 B2 | 3/2019 | Buchanan et al. | |
| 2004/0154307 A1* | 8/2004 | Carrea | F23R 3/286 60/722 |
| 2011/0027728 A1* | 2/2011 | Milosavljevic | F23R 3/286 431/2 |
| 2012/0180491 A1* | 7/2012 | Hadley | F23R 3/286 60/742 |
| 2013/0040255 A1* | 2/2013 | Shi | C10J 3/503 431/75 |
| 2013/0239581 A1* | 9/2013 | Johnson | F23R 3/286 60/737 |
| 2013/0298562 A1 | 11/2013 | Cai et al. | |
| 2015/0059353 A1* | 3/2015 | Asai | F23R 3/26 60/785 |
| 2016/0040599 A1* | 2/2016 | Chen | F23R 3/286 60/39.821 |
| 2017/0227225 A1* | 8/2017 | DiCintio | F23D 11/40 |
| 2017/0321609 A1* | 11/2017 | Ogata | F02C 7/228 |
| 2018/0094814 A1* | 4/2018 | Proscia | F23R 3/12 |
| 2018/0328588 A1 | 11/2018 | Lemon et al. | |
| 2018/0363899 A1* | 12/2018 | Johnson | F23R 3/14 |
| 2021/0199298 A1* | 7/2021 | Berry | F23R 3/26 |
| 2021/0199300 A1* | 7/2021 | Berry | B01F 25/31423 |

FOREIGN PATENT DOCUMENTS

| | | | | |
|---|---|---|---|---|
| CN | 111316041 A | 6/2020 | | |
| EP | 2206964 A2 | 7/2010 | | |
| EP | 3217097 A1 | 9/2017 | | |
| EP | 3450850 A1 * | 3/2019 | ............... | F02C 3/20 |

OTHER PUBLICATIONS

US 2017227225 A1 counterpart of CN 107044656 A was already considered on Jan. 17, 2024. EP 3450850 A1 counterpart of CN 111316041 A was already considered on Jan. 17, 2024.

* cited by examiner

COMBUSTOR FOR A GAS TURBINE

FIELD OF INVENTION

The present invention relates to a combustor for a gas turbine and particularly but not exclusively a distributed combustion system suitable for burning fuel with a significant hydrogen content or a high hydrocarbon content without flashback.

BACKGROUND OF INVENTION

Current dry low emissions (DLE) combustion systems comprise a radial swirler having an annular array of vanes defining slots there between and through which compressed air passes in a radially inward and tangential direction to create a swirling fuel and air mixture. The fuel and air mixture pass through a pre-chamber and into a combustion chamber where it is burned. The DLE combustion system comprises a main fuel supply and a pilot fuel supply. The main fuel supply, usually a gas fuel, is injected from two locations in each slot of the radial swirler. In one location, there is a fuel injection hole in the base of each slot near to the entrance of the slot, i.e. in a radially outer part of the slot. In the other location, there are two side injection holes on the vanes in each slot. Mixing of main fuel may be assisted by the injector nozzle being in a counter-bore. The pilot fuel injector is located on a base plate, which defines an axial extent of the pre-chamber, and usually radially inwardly of the swirler vanes.

There are two distinct flames formed in the DLE combustion system. The flame generated from the main fuel injection, which is premixed, produces the main flame and fuel injected from the pilot injector which is a diffusion flame. It is known to have a combustor with further fuel injection locations and at an axially downstream location compared to the main and pilot injectors. This is known as a Distributed Combustion System (DCS) or an axial fuel stage combustor. The main objective of using axial fuel staging is to lower CO at low loads or conserve efficiency and reduce NOx emissions by distributing the flame so that overall maximum temperatures in the combustor are lowered.

However, in the known DCS, fuel injected via the further fuel injection can only be premixed to achieve the above objectives. Hence, for existing technologies a diffusion flame in the DCS is not possible. However, any premixing will also lead to flame flashback or flame holding if there are any local stagnation or recirculation zones created. Thus, for conventional distributed combustion systems it is not possible to use fuels with a significant hydrogen content of a high-hydrocarbon contents because flash-back will occur.

SUMMARY OF INVENTION

Thus, an object of the presently disclosed combustor is to provide a combustion system which prevents flame flashbacks yet provides efficient combustion with low emissions. Another object of the presently disclosed combustor is to provide better mixing of fuel and air. Another object of the presently disclosed combustor is to provide a more stable combustion process.

The above objects are achieved by a combustor for a gas turbine, the combustor comprising a combustor axis about which is arranged in flow sequence a radial swirler, a pre-chamber and a combustion chamber. The radial swirler comprises a base plate, an annular array of swirler vanes defining swirler slots, arranged around the base plate, a main fuel injector for injecting a main fuel and a pilot fuel injector for injecting a pilot fuel. The combustor further comprising a premixer nozzle located on the combustion chamber. The premixer nozzle comprising a housing, an array of tubes within the housing and a first fuel gallery for supplying a first fuel. Each tube of the array of tubes comprising an inlet, an outlet, a first aperture and a second aperture. The first fuel gallery is arranged to supply the first fuel to the first aperture and/or the second aperture. In use, air is supplied to the combustor and a first portion of the air passes through the radial swirler and a second portion of the air passes through the tubes of the array of tubes from inlet to outlet and mixes with the first fuel that passes through the first aperture and/or the second aperture.

The premixer nozzle may comprise a second fuel gallery for supplying a second fuel to the second aperture, in use, the second portion of air passes through the tubes of the array of tubes from inlet to outlet and mixes with the first fuel from the first fuel gallery that passes through the first aperture and the second fuel from the second fuel gallery that passes through the second aperture.

At least one of the tubes, preferably all the tubes, of the array of tubes may comprise a converging portion, the converging portion converges towards the outlet, preferably the converging portion ends at the outlet.

The converging portion may have a first cross-sectional area and a second cross-sectional area, the second cross-sectional area is downstream of the first cross-sectional area, and the reduction of the cross-sectional area between the first cross-sectional area and the second cross-sectional area falls within the range 10% to 40% of the first cross-sectional area.

A fuel and air mixture may exit the outlet of the tube(s) at a velocity between and including 60 m/s and 100 m/s.

The first and/or second fuel may exit at least one of the apertures at a velocity between and including 50 m/s and 80 m/s and into the tube.

The first aperture and second aperture may oppose one another across the tube such that respective jets of first fuel and second fuel impinge on one another.

The first aperture and second aperture may be directly opposite one another across the tube and are aligned with one another.

The first aperture and second aperture may have different areas.

At least one tube, preferably a centre tube (80A), may not have a first or second aperture.

The at least one tube may have a third fuel supply arrangement for supplying a third fuel, preferably the third fuel is a liquid fuel.

The first fuel and/or the second fuel may be any one or combination of a natural gas, hydrogen, a fuel comprising at least 5% hydrogen and a higher hydrocarbon fuel like liquified petroleum gas.

The combustor chamber may comprise an array of premixer nozzles, preferably between and including 4 and 8 premixer nozzles.

The premixer nozzles may be evenly spaced around the circumference of the combustion chamber.

The premixer nozzles may be arranged such some of the premixer nozzles are axially off-set from the other premixer nozzles.

Any one or more of the main, pilot, first, second and third fuel may be each supplied by via a fuel supply line and a valve, the valve may be controllable and connected to a controller.

The controller may be configured to vary the amount of any one or more of the main, pilot, first, second and third fuels either individually, collectively or simultaneously.

In a second aspect of the present disclosure, there is provided a method of injecting fuel into a combustor as claimed in any one the preceding paragraphs, wherein the method comprises at least one of the steps injecting the fuel into the at least one tube from at least one of the apertures at a velocity between and including 50 m/s and 80 m/s and injecting a fuel and air mixture from the outlet of the at least one tube at a velocity between and including 60 m/s and 100 m/s.

BRIEF DESCRIPTION OF THE DRAWINGS

The above-mentioned attributes and other features and advantages of the present technique and the manner of attaining them will become more apparent and the presently disclosed combustor and method of operation will be better understood by reference to the following description of embodiments of the present technique taken in conjunction with the accompanying drawings, wherein.

DETAILED DESCRIPTION OF INVENTION

Figure 1:
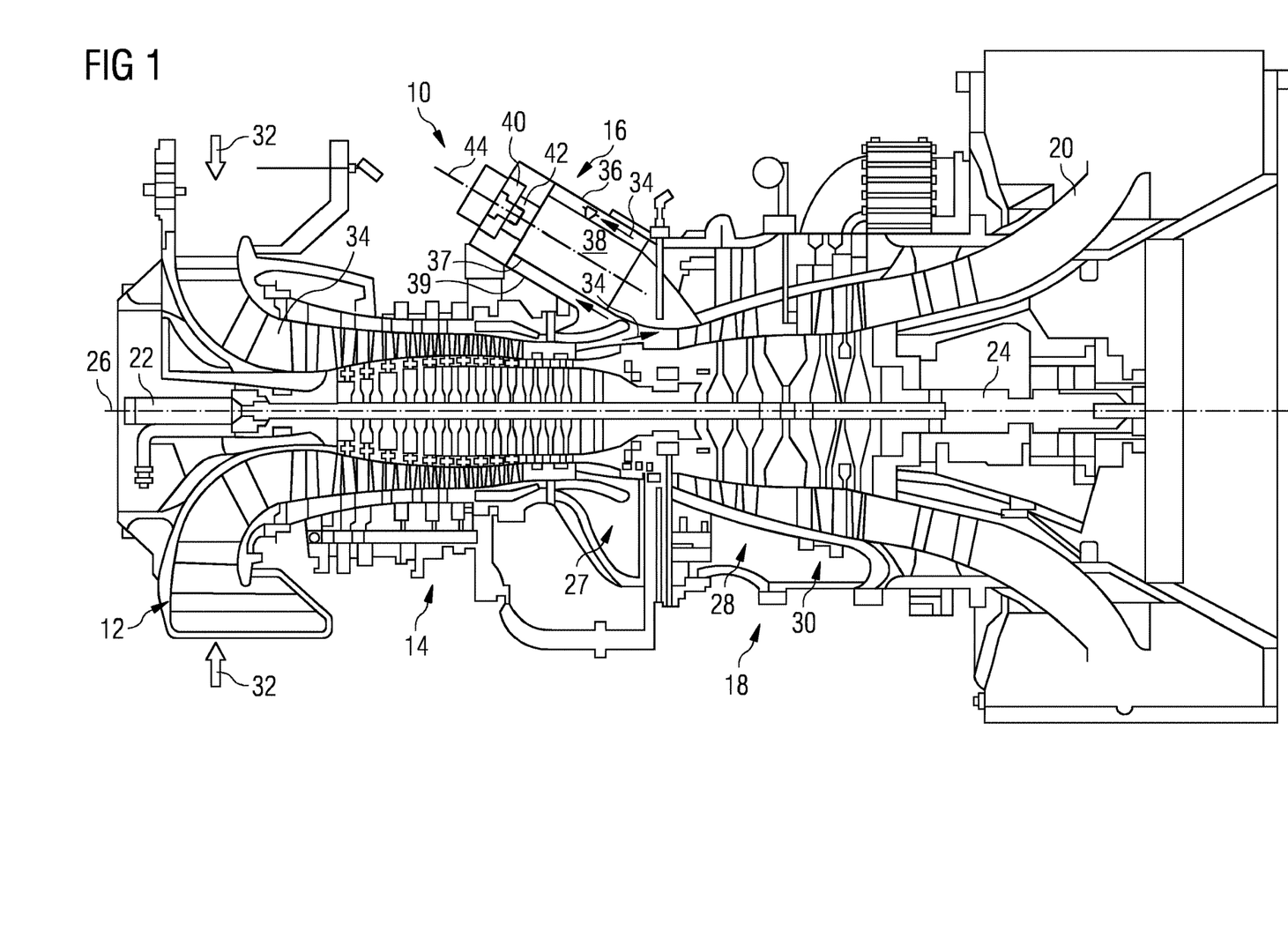
FIG. 1 shows part of a turbine engine in a sectional view and in which the present combustor is incorporated and in accordance with the present disclosure.

FIG. 1 is a schematic illustration of a general arrangement of a turbine engine 10 having an inlet 12, a compressor 14, a combustor system 16, a turbine system 18, an exhaust duct 20 and a twin-shaft arrangement 22, 24. The turbine engine 10 is generally arranged about an axis 26 which for rotating components is their rotational axis. The shafts of the twin-shaft arrangement 22, 24 may have the same or opposite directions of rotation. The combustor system 16 comprises an annular array of combustors 36, only one of which is shown. In one example, there are six combustors 36 evenly spaced about the engine 10. The turbine system 18 includes a high-pressure turbine 28 drivingly connected to the compressor 14 by a first shaft 22 of the twin-shaft arrangement. The turbine system 18 also includes a low-pressure turbine 30 drivingly connected to a load (not shown) via the second shaft 24 of the twin-shaft arrangement.

The terms radial, circumferential and axial are with respect to the engine's rotational axis 26 or as otherwise stated. The terms upstream and downstream are with respect to the general direction of gas flow through the engine and, as seen in FIG. 1, is generally from left to right.

The compressor 14 comprises an axial series of stator vanes and rotor blades mounted in a conventional manner. The stator or compressor vanes may be fixed or have variable geometry to improve the airflow onto the downstream rotor or compressor blades. Each turbine 28, 30 comprises an axial series of stator vanes and rotor blades. The stator vanes can be mounted to a radially outer casing or a radially inner drum. The rotor blades are mounted via rotor discs arranged and operating in a conventional manner. A rotor assembly comprises an annular array of rotor blades or blades and the rotor disc.

Each combustor 36 is constructed from two walls, an inner wall 37 and an outer wall 39, between which is defined a generally annular space. At the head of the combustor 36 is a radial swirler 40 which comprises a swirl plate or base plate 45, an annular array of swirler vanes 46 and fuel injection points as will be described in more detail later. The swirler 40 is succeeded by a pre-chamber 42 and then a main combustion chamber 38. These combustor 36 components are generally arranged about a combustor axis 44. The annular array of swirler vanes 46 define swirler slots 47, arranged around the base plate 45.

In operation, air 32 is drawn into the engine 10 through the inlet 12 and into the compressor 14 where the successive stages of vanes and blades compress the air before delivering the compressed air 34 into the combustor system 16. The compressed air 34 flows between the inner and outer walls 37, 39 and into the swirler 40. The swirler 40 creates highly turbulent air into which the fuel is injected. The air/fuel mixture is delivered into the pre-chamber 42, where mixing continues, and then into the main combustion chamber 38. In the combustion chamber 38 of the combustor 36 the mixture of compressed air and fuel is ignited and burnt. The resultant hot working gas flow is directed into, expands and drives the high-pressure turbine 28 which in turn drives the compressor 14 via the first shaft 22. After passing through the high-pressure turbine 28, the hot working gas flow is directed into the low-pressure turbine 30 which drives the load via the second shaft 24.

The low-pressure turbine 30 can also be referred to as a power turbine and the second shaft 24 can also be referred to as a power shaft. The load is typically an electrical machine for generating electricity or a mechanical machine such as a pump or a process compressor. Other known loads may be driven via the low-pressure turbine. The fuel may be in gaseous and/or liquid form.

The turbine engine 10 shown and described with reference to FIG. 1 is just one example of a number of engines or turbomachinery in which this invention can be incorporated. Such engines can be gas turbines or steam turbine and include single, double and triple shaft engines applied in marine, industrial and aerospace sectors.

Figure 2:
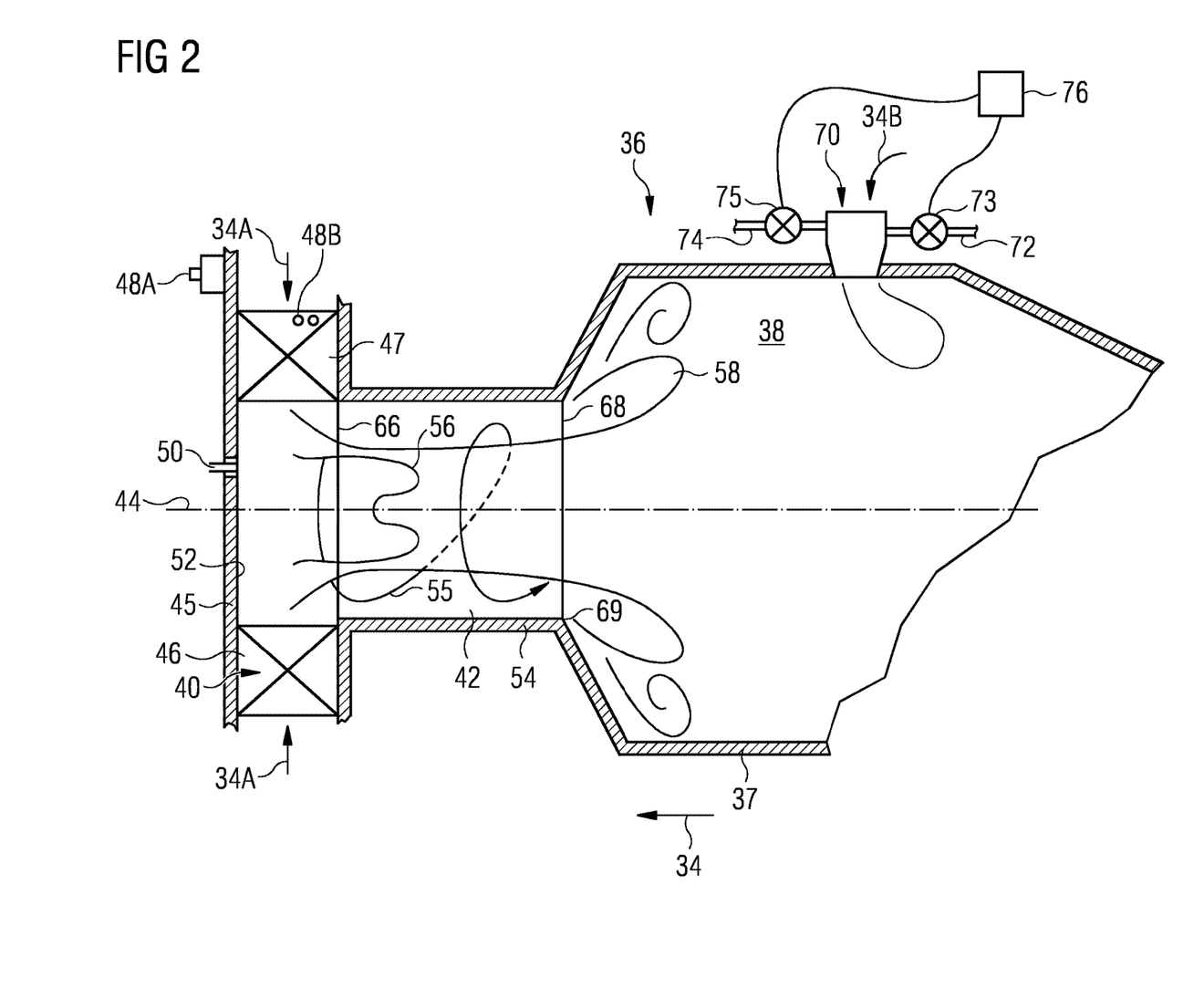
FIG. 2 is a schematic cross-section through the presently disclosed combustor and showing a premixer nozzle.

FIG. 2 is a cross-section through part of the combustor 36 of the turbine engine 10 described above and in accordance with the present invention. The radial swirler 40 comprises an annular array of vanes 46 which are angled tangentially relative to the combustor axis 44 to impart a swirling flow 55 of mixing air and fuel as is well known. The swirling flow 55 rotates about the combustor axis 44 and flows in a general left to right direction as seen in FIG. 2. The swirler vanes 46 form an array of mixing channels or swirler slots 47 between each consecutive swirler vane 46. The swirler 46 further comprises main fuel injectors 48A, 48B for injecting a main fuel and pilot fuel injectors 50 for injecting a pilot fuel. The swirler 40 comprises the base plate 45 which has a pilot surface 52 that faces the pre-chamber 42 and bounds the pre-chamber's upstream axial extent. The pre-chamber 42 is further defined by an annular wall 54 which has parallel sides as shown in this cross-section. The pre-chamber 42 has an inlet 66 and an outlet 68. The outlet 68 forms or is at a lip 69 of the pre-chamber 42 and defines where the pre-chamber 42 terminates. The pre-chamber's 42 annular wall 54 is then succeeded by the generally annular wall 37 of the main combustion chamber 38. From the lip 69 and downstream the generally annular wall 37 is divergent and opens to define the main combustion chamber 38. The main combustion chamber 38 has a greater cross-sectional area than that of the pre-chamber 42.

There are two distinct fuel/air mixtures and subsequently combustion flames in the combustion chamber 38; a pilot flame 56 is derived from the pilot fuel/air mixture and the main flame 58 is derived from the main fuel/air mixture. The pilot flame 56 and the main flame 58 are distinct from one another because of the location of the respective fuel injection points within the air flow 34A in or near to the mixing channel(s) 47. The main fuel injectors 48A, 48B inject main fuel into the swirler slot or mixing channel 47 further away from, i.e. radially outwardly of, the combustor axis 44 than the pilot fuel injector(s) 50. Thus, the respective fuel/air mixtures form substantially different flame regions with the pilot flame 56 generally radially inward of the main flame 58.

Radial swirlers, as in the case here, have or can be defined as having, a swirl number SN. The swirl number can be calculated as is well known in the art, suffice to say here, that the swirl number can be defined by a relationship between the fluxes of angular and linear momentum of the fuel/air mixture. That is to say, the angular momentum relates to rotational velocity about the combustor axis 44 and the linear momentum relates to the velocity in the axial direction along the combustor axis 44. Thus, the SN is defined herein as the ratio of tangential momentum to axial momentum of the fluid or fuel/air mixture.

The general schematic cross section of FIG. 2 shows a Dry Low Emissions (DLE) combustor 36. The known radial swirler 40 described above has a SN in the region 0.5 to 0.8. This combustor provides a good DLE burner for combusting methane and medium calorific value fuels (MCV fuels) containing hydrocarbons. However, this current design is not suitable for burning fuel with significant (e.g. >5% by weight) hydrogen or high-hydrocarbon content mainly due to dominance of a significantly higher flame speed on the flow characteristics. The presence of hydrogen or high-hydrocarbon in the fuel increases flame speed and causes flash-back into the pre-chamber 42. This is clearly detrimental and undesirable and can cause extinction of the flame and increased emissions of nitrous oxides, sulphur oxides and unburned hydrocarbons amongst other undesirable combustion by products.

The present combustor 36 comprises a premixer nozzle 70 which is located on the wall 37 of the combustion chamber 38. As shown in this example, the combustor 36 comprises first fuel supply line 72 and a second fuel supply line 74 and valves 73 and 75 respectively situated on the first fuel supply line 72 and the second fuel supply line 74. Each of the valves 73, 75 is connected to a controller 76. The controller 76 may be part of the gas turbine engine's electronic control unit. The valves 73, 75 are independently controllable to and between open and close to vary the amount for fuel flowing therethrough and to the premixer nozzle 70. The valves 73, 75 (and the valve 99 described with reference to FIG. 4 later) may be operated independently or together in an open loop or closed loop configuration to control emissions, performance and engine output.

Although only one premixer nozzle 70 is shown on FIG. 2, the exemplary combustor chamber 36 comprises an array of premixer nozzles 70. In one example, there are 4 premixer nozzles 70 and which are even spaced about the circumference of the combustion chamber 36. In other examples, there may be up to and including 8 premixer nozzles. The premixer nozzles 70 are all located at the same axial position relative to the combustor axis 44; however, in other examples there may be two or more axial positions such that, in circumferential sequence, alternate premixer nozzles 70 are axially off-set from one another.

Figure 3:
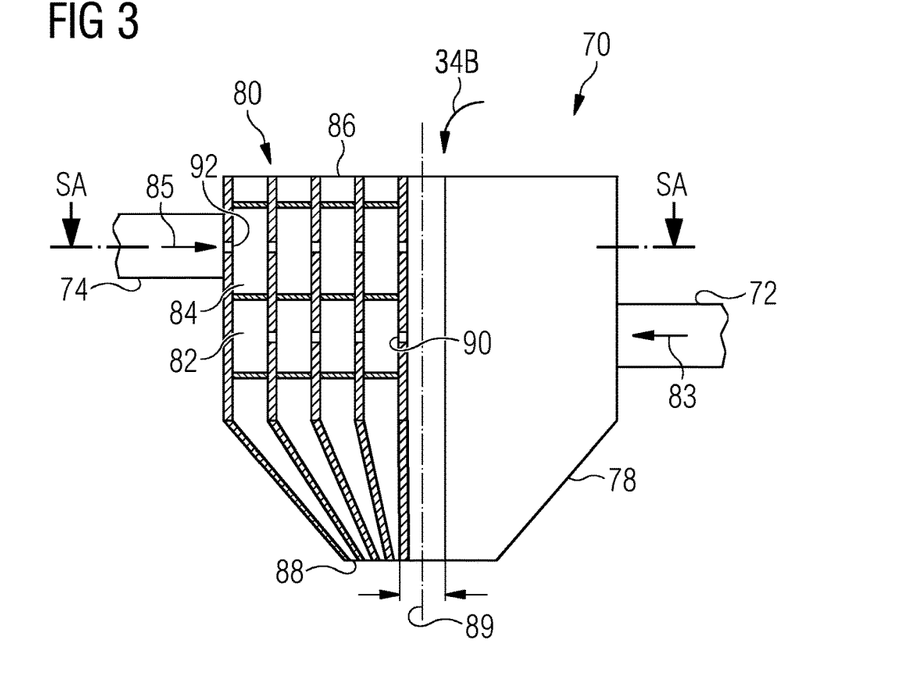
FIG. 3 is a schematic cross-section through a first embodiment of the presently disclosed premixer nozzle.

FIG. 3 shows a partial cut away of the premixer nozzle 70. The premixer nozzle 70 comprises a housing 78 and an array of tubes 80 within the housing 78. The housing 78 is secured to the combustor wall 37 in a conventional manner such as welding. The array of tubes 80 has a centreline 89 and which is generally aligned radially inwardly at the combustor axis 44. In other embodiments the centreline 89 may be axially angled relative to the axial line (i.e. away from a radial line) and/or tangentially angled in either direction.

Each tube 80 of the array of tubes 80 comprises an inlet 86 at a radially outer part of the premixer nozzle 70 and an outlet 88 at a radially inner part of the premixer nozzle 70. Each tube 80 has a first aperture 90 and a second aperture 92. The apertures 90, 92 are located nearer the inlet 86 than the outlet 88. The premixer nozzle 70 has a first fuel gallery 72 for supplying a first fuel 83 and a second fuel gallery 74 for supplying a second fuel 85.

The premixer nozzle 70 is formed by an additive manufacturing process such as laser deposition and therefore complex configurations of the array of tubes 80 and fuel galleries 72, 74 can easily be formed as a monolithic structure.

In use, air 34 is supplied to the combustor 36 and a first portion 34A of the air passes through the radial swirler 40 and a second portion 34B of the air passes through the tubes 80 of the array of tubes 80 in the direction from inlet 86 to outlet 88 and which is generally radially inwardly towards the combustor axis 44. The air 34B mixes with the first fuel 83 that passes through the first aperture 90 and the second fuel 85 that passes through the second aperture 92 of each tube 80. The air and fuel mix with one another in the tubes 80 before being injected through the outlet 88 and into the combustion chamber 38.

Figure 4:
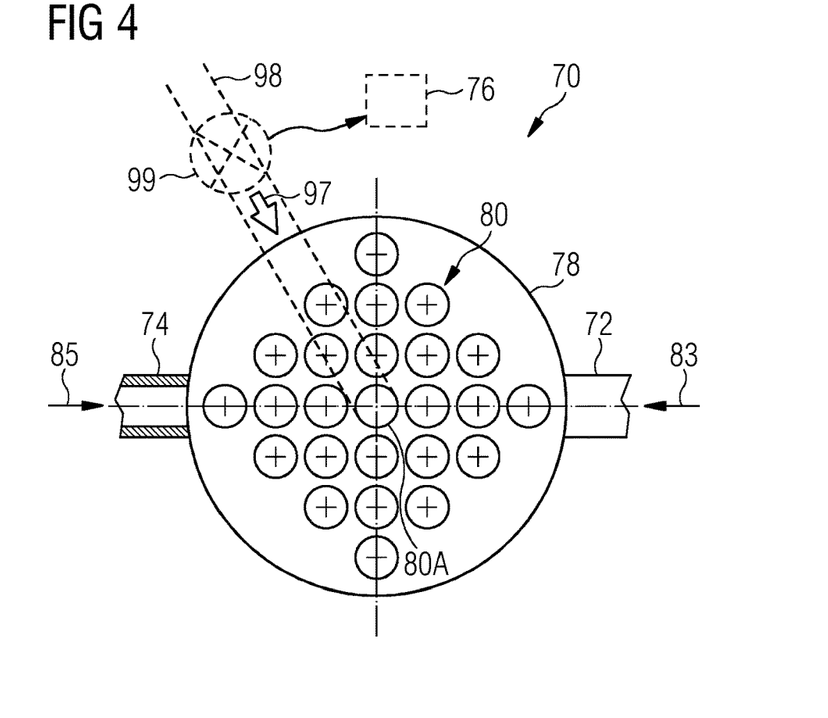
FIG. 4 is a sectional view SA-SA of the premixer nozzle as shown on FIG. 3.
Figure 5:
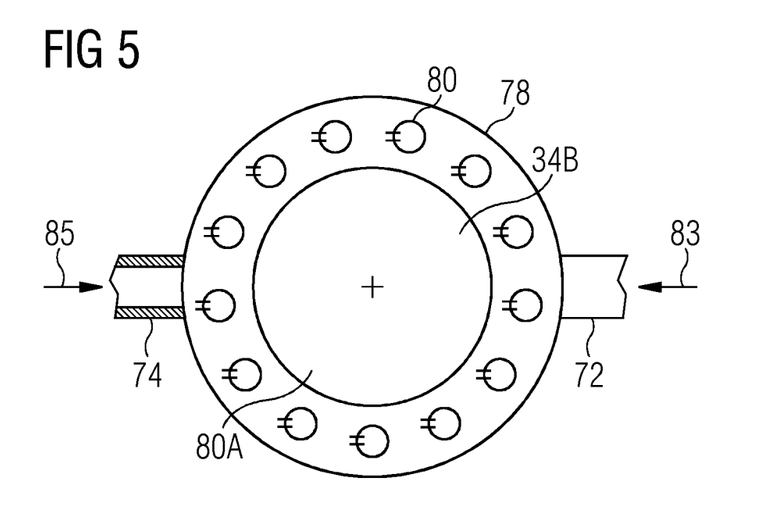
FIG. 5 is another sectional view SA-SA of an alternative embodiment of the premixer nozzle.

FIG. 4 is a section SA-SA of the premixer nozzle 70 as seen on FIG. 3. Here one example of the arrangement of the array of tubes 80 can be seen. The tubes 80 are packed together tightly such that diagonal rows are off-set from one another in a body-centred fashion. Alternatively, in FIG. 5 which is a section SA-SA of the premixer nozzle 70 as seen on FIG. 3, the tubes 80 are arranged around the outer periphery of, but inside, the housing 78. In both examples, at least one tube 80A does not have a first or second aperture 90, 92. This tube 80A is located centrally of the array of tubes 80. However, not only may there be other tubes 80A, but the tube(s) 80A may be located off-centre. For this tube 80A, only air 34B passes therethrough. The main purpose of the tube 80A is to feed air only and directly from supply 34B to provide sufficient oxygen to burn out any CO that the premixer nozzle 70 might produce at or immediately surrounding outlet 88. Further, the tube 80A ensures that the premixer nozzle 70 has some degree of air to mix with the fuel-air mixture exiting from other tubes 80 and which enhances features like air assist to vary the local equivalence ratio and hence temperature of the flame. In another example, a third fuel 97 may be supplied via a third fuel supply arrangement 98. The third fuel supply arrangement 98 comprises a valve 99 for varying the amount of third fuel 97. The valve 99 is controllable via the controller 76. Preferably, the third fuel 97 is a liquid fuel, but may be a gaseous fuel. The tube 80A may have a greater cross-sectional area than the other tubes 80.

Figure 6:
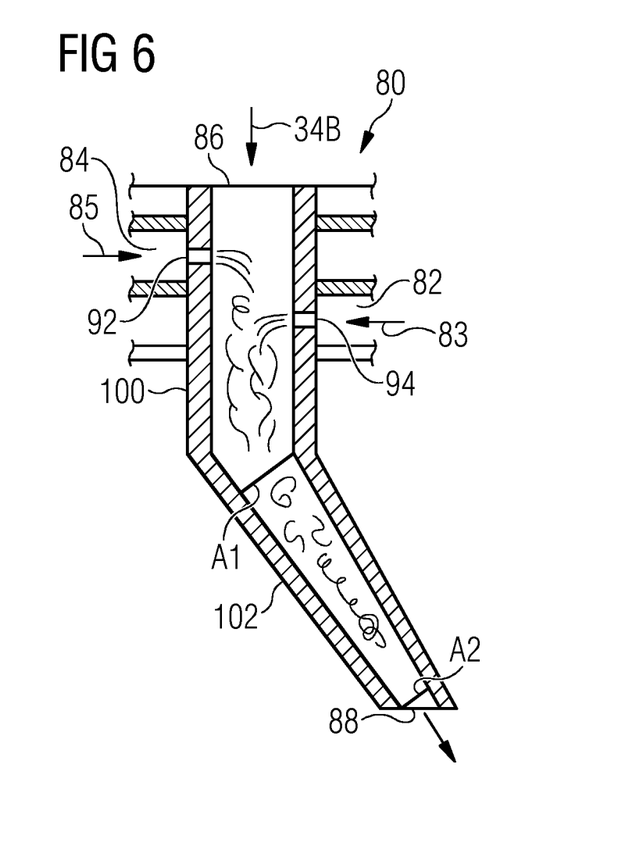
FIG. 6 is a schematic cross-section through a second embodiment of the presently disclosed premixer nozzle.
Figure 8:
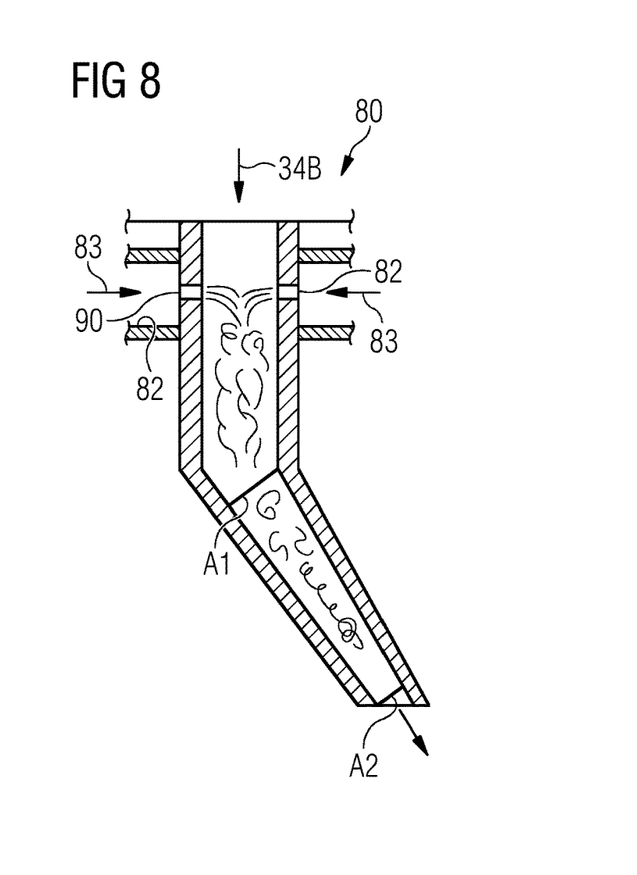
FIG. 8 is an enlarged view of an alternative embodiment of one tube of an array of tubes of the premixer nozzle.

FIG. 6 is an enlarged view of one tube 80 of the array of tubes 80 of the premixer nozzle 70. The tube 80 has a converging portion 102 that converges towards the outlet 88. The tube 80 has a generally constant cross-sectional area portion 100 that is located radially outwardly of the converging portion 102. The generally constant cross-sectional area portion 100 is arranged parallel or approximately parallel to the centreline 89. The converging portion 102 is angled towards the centreline 89 relative to the direction of gas flow therethrough or considering the direction towards the outlet 88 from the inlet 86. Within portion 100 the first aperture 90 and the second aperture 92 are located. Nonetheless, in other embodiment the first aperture 90 and/or second aperture 92 may be located in the converging portion 102. Further, the whole tube 80 may converge from the inlet 86 to the outlet 88. The converging portion 102 has a cross-sectional area and the cross-sectional area of the converging portion 102 reduces between 10% and 40% towards the outlet of the tube 80. FIGS. 6 and 8 show cross-sectional areas A1 and A2. Area A1 is upstream of area A2. The percentage of area change (e.g. between A1 and A2) is at least partly dependent the fuel composition being used. The higher the hydrogen content and/or the higher-hydrocarbon based fuels the greater the reduction in cross-sectional area required. The greater the percentage of reduction in cross-sectional area means a corresponding increase in the velocity of the fuel exiting from the tubes 80. Preferably, from the cross-section A1 to the cross-section A2 of the tubes 80 the reduction is cross-sectional area falls within the range 10% to 40% of the cross-sectional area of the cross-section A1. It should be noted that the all the tubes may have the same reduction in cross-sectional area or some of the tubes 80 may have a different reduction in cross-sectional area than other tubes 80. The reduction of the cross-sectional area of each tube 80 may be further based on the number of premixer nozzles 70 and number of tubes 80 each premixer nozzle 70 has. Any specific design of the premixer nozzle 70 and including the rate of convergence, fuel and air pressures and combustion chamber pressure should be such that the fuel and air mixture exits the tube outlets 88 at a velocity between and including 60 m/s and 100 m/s.

One of the first aperture 90 and the second aperture 92 are located radially outwardly of the other and in this example the second aperture 92 is located radially outwardly of the first aperture 90. The second fuel 85 is injected into the tube 80 as a jet where it impinges on the air 34B and begins to mix, then the first fuel 83 is injected into the air and fuel mixture and further creates turbulence to enhance mixing of the fuel and air. Fuels with higher hydrocarbon content are injected from the first aperture 90 as the first fuel 83 and fuels which are lighter, e.g. having a hydrogen content, are injected from the second aperture 92 as the second fuel 85. One reason for this is that heavier hydrocarbon-based fuels need longer residence time in the tubes 80 to mix with the air than lighter fuels such as those with a hydrogen content. The first aperture 90 and the second aperture 92 are off-set from one another relative to the direction of air 34B flow. It is an advantage of the design that the two fuel jets impinge on one another to enhance turbulence and therefore mixing of air and fuel prior to injection into the combustion chamber 38. Thus, the two apertures 90 and 92 should be positioned accordingly and preferably within twice the sectional width (or diameter) of the tube 80.

Figure 7:
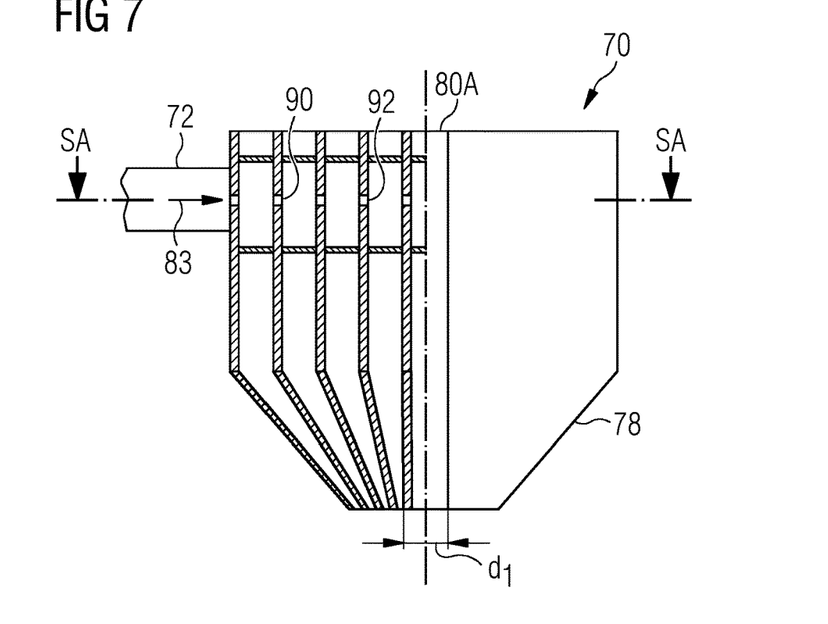
FIG. 7 is an enlarged view of one tube of an array of tubes of the premixer nozzle.

FIG. 7 is a schematic cross-section through a second embodiment of the presently disclosed premixer nozzle 70. Here, the second gallery 84, the second fuel supply line 74 and valve 75 are omitted when compared to the first embodiment of the premixer nozzle 70 described with reference to FIG. 3. Other features are similar to the first embodiment and will not be described again.

The first fuel gallery 82 is arranged to supply the first fuel 83 to the first aperture 90 and the second aperture 92 in each tube 80. In other words, the first aperture 90 and the second aperture 92 are within the first fuel gallery 82. In use, air 34 is supplied to the combustor 36 and a first portion 34A of the air passes through the swirler and a second portion of the air passes through the tubes 80 of the array of tubes 80 from inlet 86 to outlet 88 and mixes with the first fuel 83 that passes through the first aperture 90 and the second aperture 92.

FIG. 8 is an enlarged view of an alternative embodiment of one a tube 80 of an array of tubes 80 of the second embodiment of the premixer nozzle 70. Similar features are given similar reference numbers compared to the FIG. 6 embodiment and are not described again. In this second embodiment, the first aperture 90 and the second aperture 92 are aligned with one another across the tube 80. That is, the first aperture 90 and the second aperture 92 direct a jet of first fuel 83 to impinge on one another and approximately in the centre of the tube 80. The impingement of the two fuel jets creates turbulence and enhanced mixing with the air 34B which is highly desirable.

For the first embodiment and the second embodiment of the premixing nozzle 70, the fuel exits at least one of the apertures 90, 92 and preferably both at a velocity between and including 50 m/s and 80 m/s. The apertures 90, 92 are sized accordingly and in view of the viscosity and density of the fuel type as well as the pressure of the fuel supply. Thus, one of the apertures 90, 92 may have a different outlet area to the other aperture 92, 90. Once mixed with the air 34B, the fuel and air mixture exits the tube outlet 88 at a velocity between and including 60 m/s and 100 m/s.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A combustor for a gas turbine, the combustor comprising:
    a combustor axis about which is arranged in flow sequence,
    a radial swirler,
    a pre-chamber and
    a combustion chamber,
    wherein the radial swirler comprises:
      a base plate, an annular array of swirler vanes, defining swirler slots, arranged around the base plate,
a main fuel injector for injecting a main fuel and
a pilot fuel injector for injecting a pilot fuel,
wherein the combustor further comprises:
a premixer nozzle located in the combustion chamber, the radial swirler disposed upstream relative to the premixer nozzle and in fluid communication with the pre-chamber, the premixer nozzle comprising:
a housing,
an array of tubes within the housing of the premixer nozzle, and
a first fuel gallery for supplying a first fuel,
each tube of the array of tubes comprising an inlet, an outlet, a first aperture and a second aperture, wherein the first aperture and the second aperture of each tube of the array of tubes are respectively disposed relatively closer to the inlet than to the outlet, wherein the inlet of each tube of the array of tubes is fluidly connected to receive compressed air from a compressor connected to the gas turbine,
wherein the first fuel gallery is arranged to supply the first fuel to the first aperture and/or the second aperture of each tube of the array of tubes,
wherein the premixer nozzle further comprises a second fuel gallery for supplying a second fuel to the second aperture, wherein, in use, a first portion of the compressed air is arranged to pass through the radial swirler to be conveyed directly from the pre-chamber to the combustion chamber, and a second portion of the compressed air is directly conveyed to the premixer nozzle to pass through the tubes of the array of tubes from the inlet to the outlet, wherein the second portion of the compressed air mixes with the first fuel and the second fuel as the second portion of the compressed air travels from the inlet to the outlet of each tube of the array of tubes within the housing of the premixer nozzle.

2. The combustor as claimed in claim 1, wherein at least one of the tubes of the array of tubes comprises a converging portion, the converging portion converges towards the outlet, wherein the converging portion ends at the outlet.

3. The combustor as claimed in claim 2, wherein the converging portion has a first cross-sectional area and a second cross-sectional area, the second cross-sectional area is downstream of the first cross-sectional area, and the reduction of the cross-sectional area between the first cross-sectional area and the second cross-sectional area falls within the range from 10% to 40% of the first cross-sectional area.

4. The combustor as claimed in claim 1, wherein a respective mixture of the first fuel, the second fuel and air exit from the outlets of each tube of the array of tubes at a velocity between and including 60 m/s and 100 m/s.

5. The combustor as claimed in claim 1, wherein the first fuel and/or the second fuel exits at least one of the apertures at a velocity between and including 50 m/s and 80 m/s and into the tube.

6. The combustor as claimed in claim 1, wherein the first aperture and second aperture oppose one another across the tube such that respective jets of the first fuel and the second fuel impinge on one another.

7. The combustor as claimed in claim 6 wherein the first aperture and second aperture are directly opposite one another across the tube and are aligned with one another.

8. The combustor as claimed in claim 1, wherein the first aperture and second aperture have different areas.

9. The combustor as claimed in claim 1, wherein at least one tube of the array of tubes comprises a centre tube, and the centre tube does not have a first aperture or a second aperture.

10. The combustor as claimed in claim 9 wherein the at least one tube has a third fuel supply arrangement for supplying a third fuel, wherein the third fuel is a liquid fuel.

11. The combustor as claimed in claim 1, wherein the first fuel and/or the second fuel are any one or combination of a natural gas, hydrogen, a fuel comprising at least 5% hydrogen and a higher hydrocarbon fuel like liquified petroleum gas.

12. The combustor as claimed in claim 1, wherein the combustion chamber comprises an array of premixer nozzles, between and including 4 and 8 premixer nozzles.

13. The combustor as claimed in claim 12 wherein the premixer nozzles are evenly spaced around the circumference of the combustion chamber.

14. The combustor as claimed in claim 1, wherein the premixer nozzles are arranged such that some of the premixer nozzles are axially off-set from the other premixer nozzles.

15. The combustor as claimed in claim 1, wherein any one or more of the main fuel, the pilot fuel, the first fuel, and the second fuel are each supplied by a fuel supply line and a valve,
wherein the valve is controllable and is connected to a controller, and wherein the controller is configured to vary the amount of any one or more of the main fuel, the pilot fuel, the first fuel, and the second fuel either individually, collectively or simultaneously.

16. A method of injecting fuel into the combustor as claimed in claim 1, wherein the method comprises at least one of the following steps:
injecting the first fuel and/or the second fuel into at least one tube of the array of tubes through at least one of the apertures of the at least one tube of the array of tubes at a velocity between and including 50 m/s and 80 m/s and
injecting a mixture of fuel and air from the outlet of the at least one tube of the array of tubes at a velocity between and including 60 m/s and 100 m/s.

* * * * *